(12) United States Patent
Taniguchi

(10) Patent No.: US 10,753,782 B2
(45) Date of Patent: Aug. 25, 2020

(54) LIQUID-SURFACE DETECTION DEVICE

(71) Applicant: DENSO CORPORATION, Kariya, Aichi-pref. (JP)

(72) Inventor: Kouta Taniguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 203 days.

(21) Appl. No.: 16/074,786

(22) PCT Filed: Oct. 21, 2016

(86) PCT No.: PCT/JP2016/081201
§ 371 (c)(1),
(2) Date: Aug. 2, 2018

(87) PCT Pub. No.: WO2017/134867
PCT Pub. Date: Aug. 10, 2017

(65) Prior Publication Data
US 2019/0041252 A1    Feb. 7, 2019

(30) Foreign Application Priority Data

Feb. 5, 2016  (JP) .................................. 2016-020865

(51) Int. Cl.
| G01F 23/30 | (2006.01) |
| --- | --- |
| F01M 11/12 | (2006.01) |
| G01F 23/74 | (2006.01) |
| G01F 23/00 | (2006.01) |
| G01F 23/62 | (2006.01) |

(52) U.S. Cl.
CPC ........... *G01F 23/303* (2013.01); *F01M 11/12* (2013.01); *G01F 23/0007* (2013.01); *G01F 23/62* (2013.01); *G01F 23/74* (2013.01)

(58) Field of Classification Search
CPC ................. G01F 23/00; G01F 23/0007; G01F 23/30–76; F01M 11/12
See application file for complete search history.

(56) References Cited

U.S. PATENT DOCUMENTS

| 4,497,205 A | * | 2/1985 | Zulauf | .................... G01F 23/62 |
| --- | --- | --- | --- | --- |
| | | | | 200/840 |
| 2016/0123791 A1 | | 5/2016 | Yasuda | |
| 2016/0238431 A1 | | 8/2016 | Suzuki | |

FOREIGN PATENT DOCUMENTS

| JP | 2006284258 A | 10/2006 | |
| --- | --- | --- | --- |
| JP | 2014126399 A * | 7/2014 | ............. F01M 11/12 |
| JP | 2014235158 A | 12/2014 | |
| JP | 2015076189 A | 4/2015 | |

\* cited by examiner

*Primary Examiner* — Nguyen Q. Ha
(74) *Attorney, Agent, or Firm* — Harness, Dickey & Pierce, P.L.C.

(57) ABSTRACT

A float floats on a liquid inside a container and is movable upward and downward according to a liquid surface level. A cover is located inside the container and houses the float inside the cover. A detector detects the position of the float. The cover includes a support part and a wall part. The support part allows upward and downward displacement of the float and restricts displacement of the float outward from the cover. The wall part is located around the support part. The wall part has an opening that allows communication between the inside of the cover and the outside of the cover. The area of the opening is larger than the surface area of the wall part except the opening.

4 Claims, 3 Drawing Sheets

LIQUID-SURFACE DETECTION DEVICE

CROSS REFERENCE TO RELATED APPLICATIONS

This application is a U.S. National Phase Application under 35 U.S.C. 371 of International Application No. PCT/JP2016/081201 filed on Oct. 21, 2016 and published in Japanese as WO 2017/134867 A1 on Aug. 10, 2017. This application is based on and claims the benefit of priority from Japanese Patent Application No. 2016-020865 filed on Feb. 5, 2016. The entire disclosures of all of the above applications are incorporated herein by reference.

TECHNICAL FIELD

The present disclosure relates to a liquid-surface detection device configured to detect the height of the surface of a liquid inside a container.

BACKGROUND ART

Patent Literature 1 describes a liquid level detector that detects the height of the surface of a liquid stored in a container. The liquid level detector of Patent Literature 1 includes a body attached inside the container. A float which floats on the liquid inside the container and a detection element which detects the position of the float are mounted on the body. The float and the detection element are enclosed with a cover having a bottomed tubular shape and accommodated inside a space which is formed by the body and the cover. In the liquid level detector of Patent Literature 1, the float inside the accommodating space moves upward and downward in response to changes in the liquid surface, and the detection element detects whether the liquid surface reaches a predetermined liquid surface height.

PRIOR ART LITERATURE

Patent Literature

PATENT LITERATURE 1: JP-2014-235158-A

In the above liquid level detector described in Patent Literature 1, a communication hole is formed on the cover. Oil enters the inside of the cover through the communication hole, and the detection element detects the position of the surface of the oil remaining inside the cover. Not only oil, but also air bubbles pass through the communication hole of the cover. Thus, the air bubbles may remain inside the cover and push the float down, which may result in erroneous detection by the detection element.

SUMMARY OF INVENTION

It is an object of the present disclosure to provide a liquid-surface detection device configured to restrict erroneous detection of a float caused by air bubbles.

According to one aspect of the present disclosure, a liquid-surface detection device is configured to detect a liquid surface level of liquid stored inside a container. The liquid-surface detection device comprises a float configured to float on liquid inside the container and movable upward and downward according to the liquid surface level. The liquid-surface detection device further comprises a cover configured to be located inside the container and houses the float inside the cover. The liquid-surface detection device further comprises a detector configured to detect a position of the float. The cover includes a support part configured to allow upward and downward displacement of the float and to restrict displacement of the float to an outside of the cover. The cover further includes a wall part located around the support part. The wall part has an opening configured to allow communication between an inside of the cover and the outside of the cover. An area of the opening is larger than a surface area of the wall part excluding the opening.

BRIEF DESCRIPTION OF THE DRAWINGS

The above and other objects, features and advantages of the present disclosure will become more apparent from the following detailed description made with reference to the accompanying drawings. In the drawings.

The above and other objects, features, and advantages of the present disclosure will become more apparent from the following detailed description with reference to the accompanying drawings. In the drawings.

DESCRIPTION OF EMBODIMENTS

Hereinbelow, multiple embodiments for carrying out the present disclosure will be described with reference to the drawings. In each of the embodiments, a part corresponding to an item already described in the preceding embodiment may be denoted by the same reference sign as the preceding embodiment or the preceding reference sign with one letter added to avoid repetitive description. In each of the embodiments, when only a part of a configuration is described, the other part of the configuration is similar to that of the preceding embodiment. Further, in addition to a combination of configurations clearly stated in each of the embodiments, embodiments may be partially combined unless there is an obstacle in the combination.

First Embodiment

Figure 1:
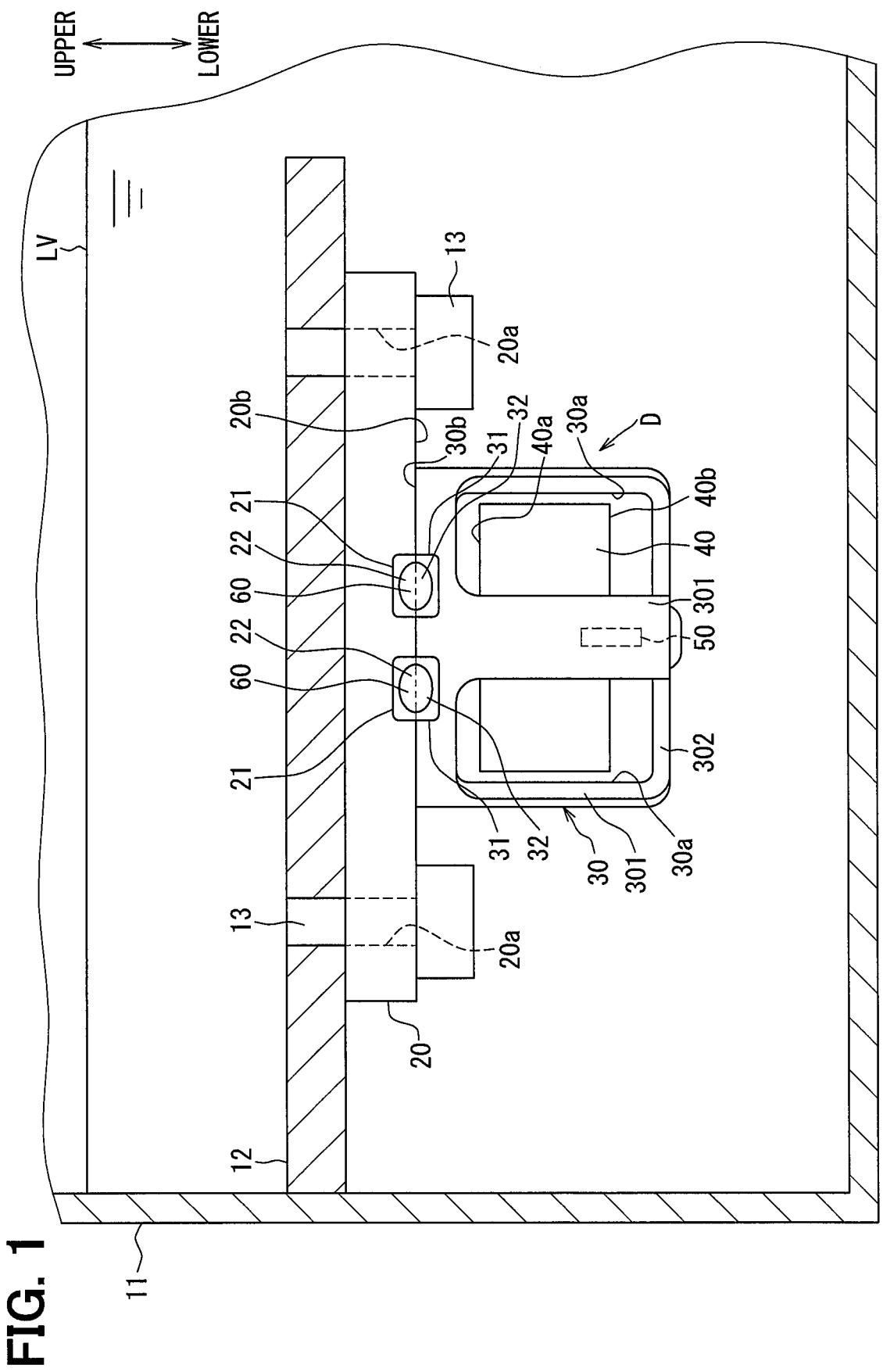
FIG. 1 is a sectional view illustrating, in a simplified manner, a state in which a liquid-surface detection device of a first embodiment is mounted on a vehicle.

A first embodiment of the present disclosure will be described with reference to FIGS. 1 to 3. A liquid-surface detection device D illustrated in FIG. 1 is mounted on an internal combustion engine of a vehicle and detects a liquid surface level LV of a lubricating oil. The lubricating oil is used in the internal combustion engine mounted on the vehicle and stored in an oil pan 11 which is attached to the lower part of a cylinder block included in the internal combustion engine. The oil pan 11 is formed of metal in a bottomed cup shape and fixed to the cylinder block of the internal combustion engine in the vehicle. The oil pan 11 covers a bottom opening of the cylinder block to store the lubricating oil for lubricating a sliding part of the internal combustion engine. When the internal combustion engine revolves, air gets mixed as air bubbles into the lubricating oil which is stirred by, for example, suction by an oil pump through a strainer or scraping by an oil scraper of a connecting rod.

An arrow indicating the upper and lower direction of FIG. 1 indicates the upper and lower direction of the liquid-surface detection device D in a mounted state on the vehicle.

A cantilever 12 which is made of metal and projects in the horizontal direction is attached to the inner face of the oil pan 11. The liquid-surface detection device D is fixed to the cantilever 12 with a bolt 13.

The liquid-surface detection device D outputs a detection signal when the liquid surface level LV of the lubricating oil inside the oil pan 11 becomes a predetermined level or less. For example, when the liquid-surface detection device D outputs the detection signal, a display device which is installed inside a cabin of the vehicle performs alarm display notifying the shortage of the amount of stored lubricating oil.

Subsequently, a specific configuration of the liquid-surface detection device D will be described. As illustrated in FIG. 1, the liquid-surface detection device D includes a body 20, a cover 30, a float 40, and a detector 50. The body 20, the cover 30, and the float 40 are formed of a resin material having excellent oil resistance. In particular, a thermoplastic resin is used as the body 20 and the cover 30. The body 20 has a plate shape and includes a bolt hole 20a. The body 20 is fixed to the cantilever 12 with the bolt 13 inserted through the bolt hole 20a. The body 20 is located under the cantilever 12. The cover 30 is located under the body 20.

The cover 30 has a bottomed cylindrical shape and includes a wall part 301 having a cylindrical shape and a bottom part 302 which closes the lower end of the wall part 301. Thus, the wall part 301 is located on the outer periphery of the bottom part and extends upward and downward. As illustrated in FIG. 3, the cover 30 includes a support part 70 which extends upward from the bottom part 302. The upper end of the wall part 301 is closed by the body 20. The float 40 is housed in an internal space of the cover 30. The internal space is surrounded by the cover 30 and the body 20.

The support part 70 supports the float 40. The support part 70 allows an upward and downward displacement of the float 40 and restricts a displacement of the float 40 to the outside of the cover 30. The support part 70 has a columnar shape and supports the float 40 with the support part 70 inserted through the float 40. The float 40 is located movably in the upper and lower direction within a predetermined range inside the cover 30. Specifically, a lower limit position of the float 40 is a contact position with the bottom part 302 on the lower side, and an upper limit position of the float 40 is a contact position with the body 20 on the upper side. Thus, the bottom part 302 restricts the float 40 from dropping. The float 40 is a member having a smaller specific gravity than the lubricating oil and formed in an annular shape. The float 40 is coaxially located outside the support part 70 and guided along the support part 70. The float 40 floats on the surface of the lubricating oil so as to move upward and downward according to the liquid surface level LV.

A large opening 30a is formed on the wall part 301. The lubricating oil flows into or flows out of the cover 30 through the opening 30a. Thus, when the liquid surface level LV of the lubricating oil stored in the oil pan 11 is located at the position illustrated in FIG. 1, that is, located above a housing chamber, the housing chamber is filled with the lubricating oil, and the float 40 is located at the upper limit position within the predetermined range. When the liquid surface level LV of the lubricating oil stored in the oil pan 11 decreases below the position of the bottom part 302, and the position of the float 40 also decreases with the decrease in the liquid surface level LV. In the following description, the position of the float 40 when the liquid surface level LV of the lubricating oil decreases to the position of the bottom part 302 is referred to as the lower limit position.

The detector 50 detects whether the position of the float 40 in the upper and lower direction is the lower limit position or lower. The detector 50 is a contactless element and detects, for example, the intensity of a magnetic field generated by a magnet (not illustrated) which is attached to the float 40. That is, the detector 50 is located in such a manner that the magnetic field intensity to be detected exceeds a threshold when the float 40 is located at the lower limit position or lower. The detector 50 may output an ON signal when the detected magnetic field intensity exceeds the threshold or may output an analog signal corresponding to the detected magnetic field intensity. In a case where an analog signal is output, a circuit component (not illustrated) may determine whether the magnetic field intensity exceeds the threshold and may output an ON signal when the magnetic field intensity is determined to exceed the threshold.

A change in the liquid surface level LV causes a change in the magnetic field generated by the magnet attached to the float 40. Further, the detector 50 converts the magnetic field change to an electric signal and outputs the electric signal. Accordingly, the configuration enables to detect the amount of lubricating oil remaining inside the oil pan 11.

Figure 2:
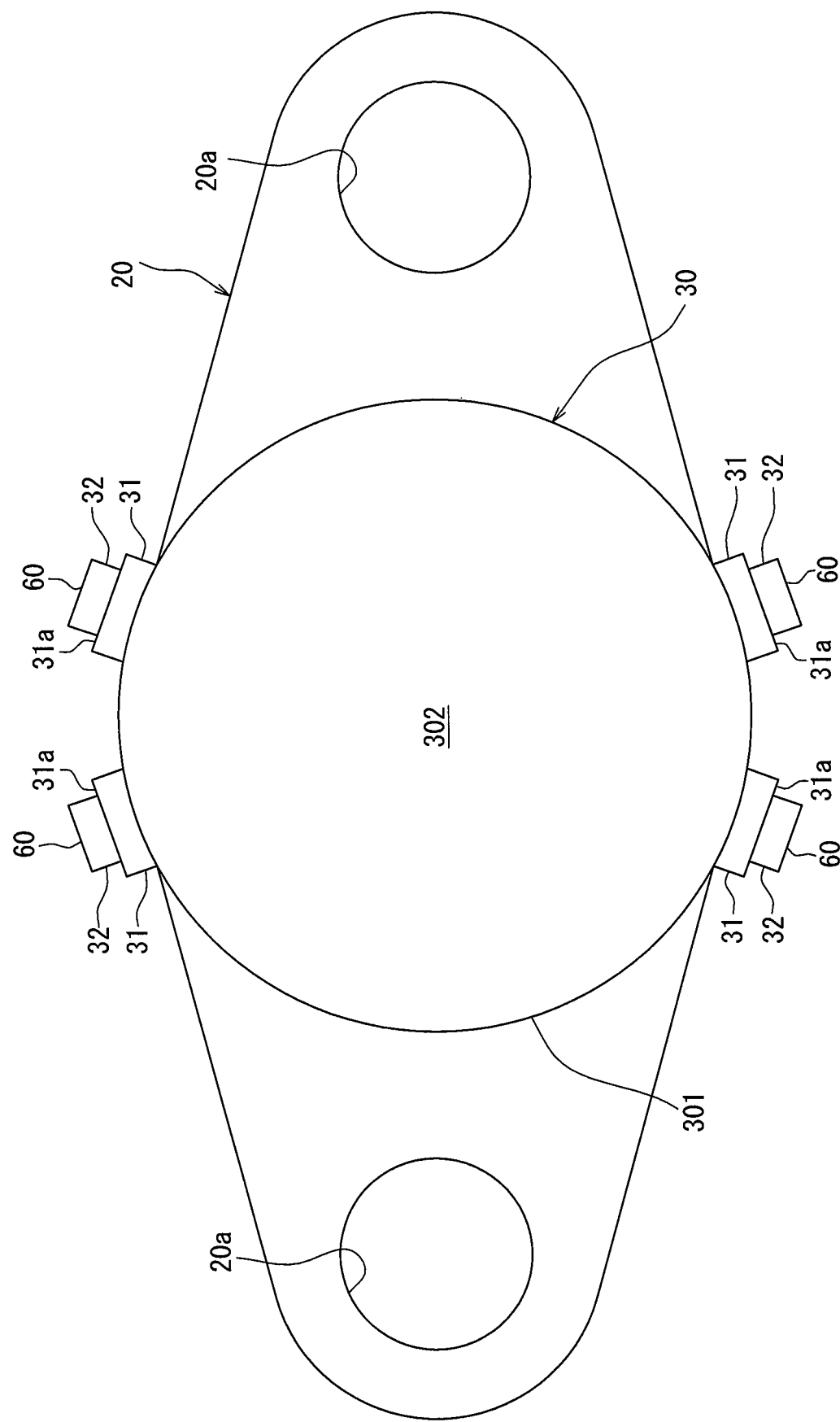
FIG. 2 is a bottom view illustrating the liquid-surface detection device.
Figure 3:
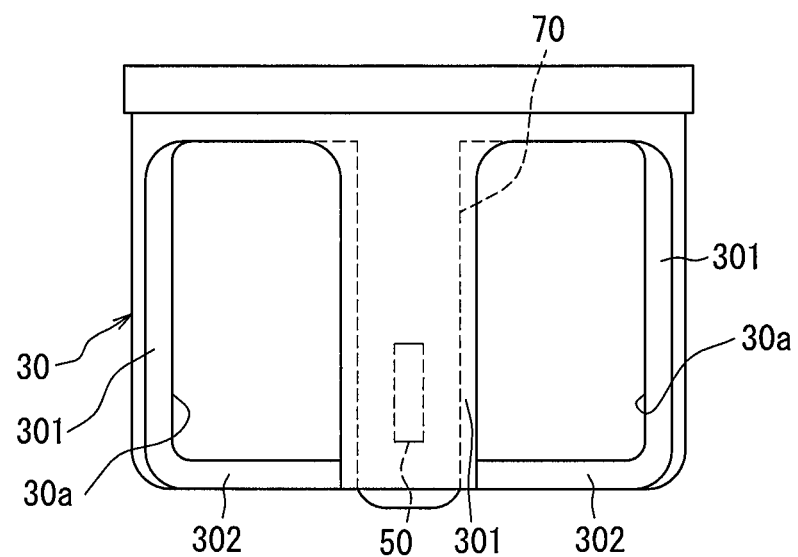
FIG. 3 is a front view illustrating a cover.

As illustrated in FIGS. 1 and 2, cover side bases 31 are formed on the wall part 301 of the cover 30. Each of the cover side bases 31 has a shape projecting in the radial direction from the outer peripheral face of the wall part 301. A cover side welding part 32 is formed on a projecting end face 31a of each of the cover side bases 31. The cover side welding part 32 has a shape projecting in the radial direction of the wall part 301. The cover side welding part 32 partially projects from the center of the projecting end face 31a. That is, the cover side base 31 and the cover side welding part 32 are formed in a shape having a step as illustrated in FIG. 2. The cover side bases 31 are formed at multiple positions of the wall part 301, respectively. The cover side welding part 32 is formed on each of the cover side bases 31. The cover side welding parts 32 and the cover side bases 31 are resin-molded integrally with the wall part 301.

Similarly, body side bases 21 are formed on the body 20. Each of the body side bases 21 has a shape projecting from the outer peripheral face of the body 20. A body side welding part 22 is formed on a projecting end face of each of the body side bases 21. The body side welding part 22 has a shape further projecting in the same direction as the projecting direction of the body side base 21. The body side welding part 22 partially projects from the center of the projecting end face. That is, the body side base 21 and the body side welding part 22 are formed in a shape having a step similar to the cover side welding part 32 and the cover side base 31 of the cover 30. The body side bases 21 are formed at a plurality of positions on the outer peripheral face of the body 20. The body side welding part 22 is formed on each of the body side bases 21. The body side welding parts 21 and the body side bases 21 are resin-molded integrally with the body 20.

The body 20 and the cover 30 are installed in such a manner that a lower face 20b of the body 20 and an upper face 30b of the cover 30 are in surface contact with each other. In such an installed state, each of the body side welding parts 22 and the corresponding one of the cover side welding parts 32 are also in surface contact with each other and welded to each other. That is, a molten and solidified part 60, which is thermally molten to be integrated and then cooled to be solidified, is formed on the surfaces of the body side welding part 22 and the cover side welding part 32. A imaginary line indicated in the molten and solidified part 60 in FIG. 1 is a boundary line that divides the body 20 and the cover 30 before welded. The body side welding parts 22 and the cover side welding parts 32 are joined together by welding in this manner, so that the cover 30 is fixed to the body 20.

Subsequently, the shape of the cover 30 will be described with reference to FIG. 3. FIG. 3 illustrates a state in which the cover side bases 31 and the cover side welding parts 32 are omitted to facilitate understanding. The cover 30 includes the support part 70, the wall part 301, and the bottom part 302 as described above. The wall part 301 is located around the support part 70. The wall part 301 has the opening 30a which allows communication between the inside of the cover 30 and the outside of the cover 30. As illustrated in FIG. 1, the area of the opening 30a is larger than the surface area of the wall part 301 excluding the opening 30a. The surface area of the wall part 301 is the surface area when the wall part 301 is viewed from the lateral side of FIG. 1.

The opening 30a extends in the upper and lower direction. The opening 30a includes four sections that are formed at intervals in the circumferential direction. In other words, the wall part 301 is located between adjacent sections of the opening 30a that are adjacent to each other in the circumferential direction. Thus, the wall part 301 is also divided into four sections and extends in a cross shape when viewed from the bottom part 302. In the circumferential direction, the dimension of the opening 30a is larger than the dimension of the wall part 301.

When the float 40 is located at the upper limit position due to floating of the float 40, an upper face 40a of the float 40 faces the opening 30a. In other words, when the float 40 is located at the upper limit position, the upper face 40a of the float 40 can be visually recognized through the opening 30a when viewed from the lateral side. Further, as illustrated in FIG. 1, when the float 40 is located at the lower limit position due to floating of the float 40, a lower face 40b of the float 40 faces the opening 30a. In other words, when the float 40 is located at the lower limit position, the lower face 40b of the float 40 can be visually recognized through the opening 30a when viewed from the lateral side. Thus, the float 40 can be constantly visually recognized through the opening 30a.

As described above, the liquid-surface detection device D of the present embodiment has the opening 30a which is formed on the wall part 301 of the cover 30. The opening 30a is larger than the surface area of the wall part 301. Since the large opening 30a is formed, an escape route of air bubbles is large, and the configuration enables to restrict air bubbles from remaining inside the cover. Thus, the configuration enables to restrict a change in the position of the float 40 caused by air bubbles and to restrict erroneous detection of the float 40 by the detector 50.

In other words, in order to restrict a malfunction in the float 40 caused by the stagnation of air bubbles, the opening 30a, which is a large window, is formed in the cover 30 to ensure an escape route of air bubbles. Further, depending on the shape of the cantilever 12, the lubricating oil may enter the inside of the cover 30 through the cantilever 12 and the body 20. When the lubricating oil enters the inside of the cover 30 from the upper side of the float 40 and the dropped lubricating oil collides against the float 40, the float 40 is pushed downward, and the detector 50 may cause erroneous detection. However, in the present embodiment, since the large opening 30a as described above resides, the lubricating oil that has collided against the float 40 easily escape through the opening 30a. Thus, the configuration enables to restrict the float 40 from being unusually pushed down by the dropped lubricating oil. Thus, the configuration does not require to closely join the cantilever 12 to the body 20, which improves the degree of freedom in designing the cantilever 12.

In the present embodiment, the liquid-surface detection device D detects the liquid surface level LV of an engine oil into which air bubbles are mixed by stirring in the internal combustion engine. The oil pan 11 is provided with the strainer, and the lubricating oil is stirred by the suction of the strainer. Thus, a through hole is formed on the cover 30 taking the flow of air bubbles into consideration in a conventional technique. However, in the present embodiment, since the opening 30a is large, it is not necessary to take the orientation and the position of the cover 30 into consideration regardless of the position of the strainer. Thus, the configuration enables to improve the degree of freedom in the installed position of the liquid-surface detection device D. As a result, a design change is not required depending on products, which enables standardization.

In the present embodiment, the cover 30 is made of a resin material. It is noted that, the large opening 30a formed on the cover 30 enables to reduce the material cost of the cover 30. Further, although the cover 30 is made of a resin material, the wall part 301 and the bottom part 302 of the cover 30 enables to ensure the strength for supporting the float 40.

In the present embodiment, when the float 40 is located at the upper limit position, the opening 30a is located at the position facing the upper face 40a of the float 40. Accordingly, the operating height of the float 40 can be measured by visual observation after the cover 30 and the body 20 are assembled to the cantilever 12, which results in an easy operation check by the position of the float 40.

Second Embodiment

Figure 4:
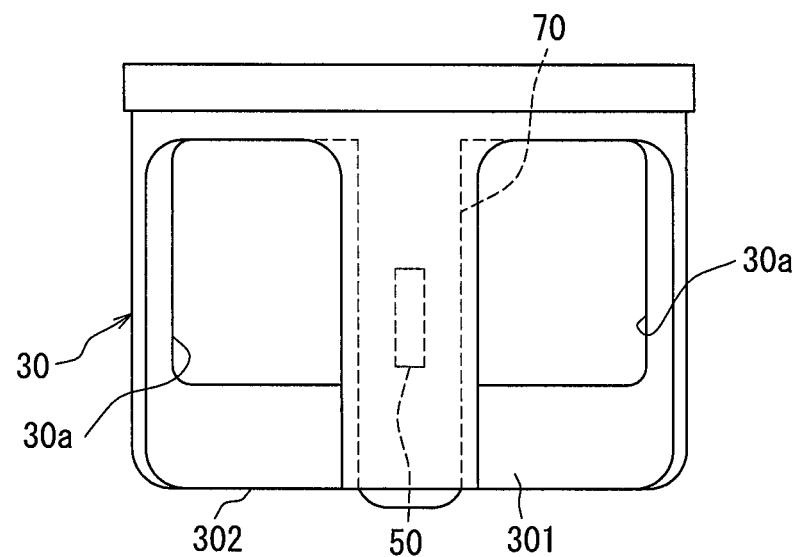
FIG. 4 is a front view illustrating a cover of a second embodiment.

Subsequently, a second embodiment of the present disclosure will be described with reference to FIG. 4. In the present embodiment, the size in the upper and lower direction of an opening 30a differs from that of the first embodiment. As illustrated in FIG. 4, the opening 30a does not face a lower face 40b of a float 40 at a lower limit position of the float 40. In other words, when the float 40 is located at the lower limit position, it is not possible to visually recognize the lower face 40b of the float 40 through the opening 30a.

Thus, the dimension in the upper and lower direction of the opening 30a is smaller than that of the opening 30a of the first embodiment as described above. A wall part 301 extends in the upper and lower direction from the entire circumference of a bottom part 302 and then branches into a cross shape by the opening 30a. Thus, the bottom part 302 and the wall part 301 are formed in a bowl shape at the lower side thereof. Thus, the bottom part 302 and the wall part 301 are capable of storing a lubricating oil.

A detector 50 is located in a part where the opening 30a is located in the circumferential direction. The detector 50 is configured to output a signal when the float 40 is located at the lower limit position.

Also with such a configuration, the opening 30a is sufficiently large. Thus, it is possible to let air bubbles escape to the outside of the cover 30 similarly to the first embodiment described above. Further, the bowl shape formed by the bottom part 302 and the wall part 301 can improve strength of the cover 30.

Other Embodiments

The structures of the above embodiments are merely examples. The scope of the present disclosure is not limited to the scope described above.

In the above first embodiment, the opening 30a includes the four divided sections. However, the number of divided sections of the opening 30a is not limited to four and can be changed taking the strength of the cover 30 and an escape of the lubricating oil and air bubbles into consideration. Further, although the opening 30a is divided in the circumferential direction, the opening 30a may be divided into a plurality of sections in the upper and lower direction.

In the above first embodiment, the liquid-surface detection device D is a liquid-surface detection device for a vehicle. However, the present disclosure may be applied not only to a liquid-surface detection device for a vehicle, but also to liquid-surface detection devices that are located inside fuel tanks of various household apparatuses and various transportation apparatuses. Thus, the present disclosure may be applied to various liquid-surface detection devices that detect a liquid surface level LV of a liquid other than oil, the liquid being stored inside a container other than the oil pan 11.

In the above first embodiment, the detector 50 which outputs an ON signal or an OFF signal by ON or OFF according to the liquid surface level LV is used. Alternatively, for example, a sensor whose signal voltage continuously varies according to the liquid surface level LV may be employed as another detector.

The liquid-surface detection device described above includes the float 40, the cover 30, and the detector 50. The float 40 floats on a liquid inside the container so as to move upward and downward according to the liquid surface level LV. The cover 30 is located inside the container and houses the float inside thereof. The detector 50 detects the position of the float. The cover includes the support part 70 and the wall part 301. The support part 70 allows an upward and downward displacement of the float and restricts a displacement of the cover to the outside. The wall part 301 is located around the support part. The wall part includes the opening 30a that allows communication between the inside and the outside of the cover. The area of the opening is larger than the surface area of the wall part excluding the opening.

According to the present disclosure as described above, the opening larger than the surface area of the wall part is formed on the cover. Since the large opening is formed, an escape route of air bubbles is large, and it is possible to restrict air bubbles from remaining inside the cover. Thus, it is possible to restrict a change in the position of the float caused by air bubbles and restrict erroneous detection of the float by the detector.

Although the present disclosure has been described based on the embodiments, it is to be understood that the present disclosure is not limited to these embodiments and structures. The present disclosure also includes various modifications and modifications within the equivalent range thereof. In addition, various combinations or modes, and other combinations or modes including only one element, more, or less thereof are also included in the scope and idea range of the present disclosure.

What is claimed is:

1. A liquid-surface detection device configured to detect a liquid surface level of liquid stored inside a container, the liquid-surface detection device comprising:
    a float configured to float on liquid inside the container and movable upward and downward according to the liquid surface level;
    a cover configured to be located inside the container and houses the float inside the cover; and
    a detector configured to detect a position of the float, wherein
    the cover includes:
        a support part configured to allow upward and downward displacement of the float and to restrict displacement of the float to an outside of the cover;
        a wall part located around the support part; and
        a bottom part, wherein
    the wall part is located on an outer periphery of the bottom part and extends in an upward and downward direction,
    the wall part has an opening configured to allow communication between an inside of the cover and the outside of the cover, and
    an area of the opening is larger than a surface area of the wall part excluding the opening, and
    the bottom part and the wall part are configured to store liquid.

2. The liquid-surface detection device according to claim 1, wherein
    when the float which floats is located at an upper limit position, an upper face of the float faces the opening.

3. The liquid-surface detection device according to claim 1, wherein
    the cover is formed of a resin material.

4. The liquid-surface detection device according to claim 1, wherein
    the container is an oil pan configured to store, as liquid, lubricating oil into which air bubbles are mixed due to stirring caused in an internal combustion engine.

* * * * *